(12) United States Patent
Keller et al.

(10) Patent No.: US 9,243,483 B2
(45) Date of Patent: Jan. 26, 2016

(54) METHODS OF USING NANO-PARTICLES IN WELLBORE OPERATIONS

(76) Inventors: Stuart R. Keller, Houston, TX (US); Shankar Sundararaman, Houston, TX (US)

(*) Notice: Subject to any disclaimer, the term of this patent is extended or adjusted under 35 U.S.C. 154(b) by 299 days.

(21) Appl. No.: 13/817,036

(22) PCT Filed: Aug. 29, 2011

(86) PCT No.: PCT/US2011/049553
§ 371 (c)(1),
(2), (4) Date: Feb. 14, 2013

(87) PCT Pub. No.: WO2012/057910
PCT Pub. Date: May 3, 2012

(65) Prior Publication Data
US 2013/0213638 A1 Aug. 22, 2013

Related U.S. Application Data

(60) Provisional application No. 61/407,238, filed on Oct. 27, 2010.

(51) Int. Cl.
| E21B 43/24 | (2006.01) |
| C04B 28/02 | (2006.01) |
| C09K 8/03 | (2006.01) |
| C09K 8/467 | (2006.01) |
| C09K 8/76 | (2006.01) |
| E21B 33/138 | (2006.01) |
| E21B 33/14 | (2006.01) |
| E21B 36/04 | (2006.01) |
| E21B 33/13 | (2006.01) |

(52) U.S. Cl.
CPC ............. *E21B 43/24* (2013.01); *C04B 28/02* (2013.01); *C09K 8/032* (2013.01); *C09K 8/467* (2013.01); *C09K 8/76* (2013.01); *E21B 33/13* (2013.01); *E21B 33/138* (2013.01); *E21B 33/14* (2013.01); *E21B 36/04* (2013.01); *E21B 43/2401* (2013.01); *C09K 2208/10* (2013.01)

(58) Field of Classification Search
USPC .................... 166/248, 278, 302, 51, 285, 288
See application file for complete search history.

(56) References Cited

U.S. PATENT DOCUMENTS

| 4,558,737 A | 12/1985 | Kuznetsov et al. |
| 5,285,846 A | 2/1994 | Mohn |
| 7,244,694 B2 | 7/2007 | Fu et al. |
| 2002/0121374 A1* | 9/2002 | Ranson ............... E21B 43/2401 166/302 |
| 2004/0069496 A1 | 4/2004 | Hosie et al. |
| 2008/0135245 A1* | 6/2008 | Smith et al. ................. 166/280.2 |
| 2008/0217008 A1 | 9/2008 | Langdon et al. |

(Continued)

*Primary Examiner* — David Andrews
*Assistant Examiner* — Kyle Armstrong
(74) *Attorney, Agent, or Firm* — ExxonMobil Upstream Research-Law Department

(57) ABSTRACT

Methods for heating a material within a wellbore using nano-particles such as carbon nano-tubes. The material may be a flowable material such as cement, drilling mud, an acidizing fluid, or other material. Generally the methods comprise placing the flowable material in proximity to a radial wall of a wellbore. The methods also include running an energy generator into the wellbore. In one aspect, energizing the nano-particles in the filter cake causes the nano-particles to be activated, and increases a temperature within the flowable material to a temperature that is greater than an initial circulation temperature of the flowable material. Activating the energy generator may also assist in curing the flowable material in situ.

32 Claims, 6 Drawing Sheets

(56) References Cited

U.S. PATENT DOCUMENTS

| | | |
|---|---|---|
| 2008/0296023 A1 | 12/2008 | Willauer |
| 2008/0296024 A1 | 12/2008 | Huang et al. |
| 2009/0038797 A1* | 2/2009 | Skala et al. ................ 166/280.1 |
| 2009/0082230 A1 | 3/2009 | Javora et al. |
| 2010/0089574 A1* | 4/2010 | Wideman et al. .......... 166/272.1 |
| 2010/0243236 A1 | 9/2010 | Koons |
| 2010/0263867 A1 | 10/2010 | Horton et al. |

* cited by examiner

METHODS OF USING NANO-PARTICLES IN WELLBORE OPERATIONS

CROSS REFERENCE TO RELATED APPLICATIONS

This application claims the benefit of U.S. Provisional Application No. 61/407,238, filed Oct. 27, 2010.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

1. Field of the Invention

The present inventions relate to the field of wellbore operations. More specifically, the inventions relate to the removal of filter cake from a wellbore, and methods for stimulating a hydrocarbon-producing well using a thermal technique. The present inventions further relate to the use of nano-particles to enable rapid localized heating of a filter cake, and alternatively to assist in the controlled curing of cement.

2. General Discussion of Technology

In the drilling of oil and gas wells, a wellbore is formed using a drill bit that is urged downwardly at a lower end of a drill string. During the drilling process, a drilling fluid is placed in the bore of the drill string. The drilling fluid is typically referred to as drilling mud, or just "mud."

The drilling mud is injected into the bore of the drill string to increase hydrostatic pressure at the bottom of the wellbore. This, in turn, controls the flow of formation fluids into the wellbore. The drilling mud also helps to keep the drill bit cool and clean during drilling. In this respect, the drilling mud is circulated down the drill string and through orifices in the drill bit. The drilling mud is then circulated back up the annular region between the drill string and the surrounding borehole. Circulation of the drilling mud in this manner allows drill cuttings to be moved away from the interface between the drill bit and the rock face, and brings the drill cuttings to the surface for analysis and/or disposal.

There are three main categories of drilling fluids: water-based muds, non-aqueous muds, and gaseous drilling fluid. Non-aqueous muds, sometimes referred to as non-aqueous fluids (NAFs), are muds where the base fluid is an oil. Environmental considerations aside, NAFs are often preferred over water-based muds and gaseous drilling fluids, as NAFs generally offer increased lubrication of the drill bit and drill string. NAFs also help stabilize shale formations more effectively than do water-based or gaseous muds. NAFs also withstand greater heat without breaking down and beneficially tend to form a thinner filter cake than water-based muds.

There are two general categories of NAFs: oil-based muds (OBMs) and synthetic-based muds (SBMs). A common example of a base fluid for an OBM is diesel oil. SBMs use a synthetic oil rather than a natural hydrocarbon as the base fluid. An example of a base fluid for a SBM is palm oil. SBMs are most often used on offshore rigs as SBMs have the beneficial properties of an OBM, but lower toxicity. This is of benefit when the drilling crew is working in an enclosed area, as may be the case on an offshore drilling rig operating in an arctic environment. Also, in some parts of the world, cuttings from wells drilled with certain types of SBMs can be discharged to the sea, and thereby may reduce the cost of cuttings disposal.

The drilling fluid used for a particular job is generally selected to avoid formation damage. For example, in various types of shale formations, the use of conventional water-based muds can result in a deterioration and collapse of the formation. Similarly, muds made from fresh water can cause clays in a sandstone or other type formation to swell and dislodge. This, in turn, can negatively affect the permeability of the sandstone near the wellbore. The use of an oil-based formulation circumvents these problems.

NAFs are also preferred in deviated or horizontally completed wellbores. The non-aqueous-based fluid provides a slick film along which tubular bodies and equipment may glide while moving across non-vertical portions of the wellbore.

As noted, a conventional oil-based drilling mud formulation is comprised basically of oil. Examples of oil include diesel oil and mineral oil. An OBM will also include a wetting agent. An example of a common wetting agent is dodecylbenzene sulfonate. An OBM may also include a thickener, or "viscosification agent." Examples of viscosification agents are amine-treated clays such as bentonite. Neutralized sulfonated ionomers have also been proposed as viscosification agents.

A NAF will also include a water phase. This typically represents sodium chloride or calcium chloride brine. The NAF will also then include a surfactant as an emulsifying agent. An example of a surfactant is an alkaline soap of fatty acids. The surfactant aids in blending the base oil with the brine and stabilizing the continuous oil emulsion. Finally, a weighting agent may be used. An example of a weighting agent is barite or barium sulfate.

As a wellbore is drilled through a permeable, hydrocarbon-bearing formation, the drilling mud will form a "filter cake." The filter cake from a NAF is comprised primarily of water droplets, weighting agent particles, and drilled cuttings previously suspended in the drilling mud. The filter cake forms a thin, low-permeability layer along permeable portions of the borehole. Beneficially, the filter cake at least partially seals permeable formations exposed by the bit. This helps prevent the loss of the liquid portion (or filtrate) of the drilling fluids into the formations during the wellbore forming process. The filter cake also helps prevent the surrounding rock matrix from sloughing into the wellbore. Of note, the drilling process can be ongoing for days or even weeks.

A low-permeability filter cake is also desirable for running completion equipment in the wellbore. For example, it is sometimes desirable to run the completion hardware in a clear brine to prevent solids plugging of a sand control screen. The mud filter cake prevents the completion brine from rapidly leaking off to the formation as the completion hardware is run. In addition, a low-permeability filter cake helps prevent the gravel used in a gravel pack from bridging off during gravel placement due to a loss of hydration in the slurry.

Near the end of the completion process for a well, it is desirable to remove the filter cake from the wellbore. In this respect, the filter cake not only prevents the invasion of drilling fluids and completion fluids into a formation, but reciprocally can hinder the movement of hydrocarbon fluids into the completed well. Further, because fine particles within the drilling mud may also penetrate into pores residing in the near wellbore region, the particles can provide an even greater barrier to flow. Thus, the productivity of a well is somewhat dependent on the operator being able to effectively remove the filter cake and wash the formation. To do this, the operator may circulate an oxidizer, an enzyme, or an acid solution through the formation to remove fine clay particles remaining from the drilling mud.

In some instances, merely circulating an acid (or other) solution into the wellbore does not completely remove the filter cake. In this instance, the hydrocarbons must at least partially flow through or around the filter cake or cause some of the filter cake to "lift off" of the wellbore face. At the same time, if some or all of the filter cake lifts off of the wellbore face, this represents a plugging hazard. For example, in the case of an open-hole completion, the filter cake pieces may plug sections of a sand control screen.

It is noted that the per-foot surface area of the filter cake is greater than that of the sand screen. Therefore, if only a small percentage of the filter cake is transferred to a sand screen, significant plugging can occur, requiring production fluids to travel a tortuous path into the production tubing.

A need therefore exists for a wellbore filter cake that can be disintegrated within the wellbore at an appropriate time after drilling. In addition, a need exists for a filter cake that can be energized downhole to increase a temperature within the filter cake to a temperature that is greater than an initial (e.g., ambient, local, or well-bore) circulation temperature of the filter cake and to cause substantial degradation of the filter cake. Further, a need exists for a drilling fluid composition that may be used to form a filter cake and which contains the means for degradation upon exposure to electromagnetic wave energy and/or thermal energy. Still further, a need exists for well completion methods that involve the use of drilling fluids, stimulation fluids, or cement that have nano-particles placed therein.

SUMMARY OF THE INVENTION

Various methods for heating a material within a wellbore are provided herein. In the various methods, the material comprises nano-particles such as carbon nano-tubes. The material is a flowable material such as cement, drilling mud, an acidizing fluid, or other material.

Generally the method comprises placing the flowable material in proximity to a radial wall of a wellbore. The material is placed within the wellbore along a selected depth. Preferably, the material is pumped either within a string of production casing or a drill string.

The method also includes running an energy generator into the wellbore. The energy generator is preferably a microwave-emitting energy source. The method then includes activating the energy generator while passing the energy generator along the selected depth in the wellbore. This serves to energize the nano-tubes within the flowable material. Energizing the nano-tubes temporarily increases a temperature of the flowable material by at least 50° C., or in some aspects at least 100° C., or in some aspects at least 200° C., greater than an initial placement temperature of the flowable material along the radial wall.

In one aspect, the method also includes mixing a volume of the carbon nano-tubes into the flowable material. This is preferably done before the flowable material is placed within the wellbore. In another aspect, the carbon nano-tubes are pre-mixed into the flowable material.

It is understood that the flowable material may be a settable or a curable material. The flowable material may be cured before the energy generator is activated. Alternatively, activating the energy generator may assist in curing the flowable material in situ.

A method for preparing a wellbore is also provided herein. The method principally has application to wells that are completed as open-holes. In one aspect, the method first includes drilling a wellbore through a subsurface formation using a drill string. The wellbore defines a radial face.

The method also includes circulating a drilling mud while drilling the wellbore. The drilling mud is preferably a non-ionic drilling mud. In one aspect, the drilling mud is a non-aqueous drilling mud that comprises diesel oil, mineral oil, a synthetic oil, or combinations thereof. The drilling mud also comprises nano-particles dispersed within the drilling mud. The nano-particles are designed to substantially heat their surroundings in response to an application of energy.

The drilling mud may comprise an aqueous phase. The aqueous phase may be, for example, between 5% and 95% by volume, or between 10% and 50% by volume. The nano-particles are sometimes preferably mixed into the aqueous phase, and preferably comprise metallic nano-particles or carbon nanotubes. In other embodiments, the drilling mud may not have an aqueous phase present, while in other embodiments the drilling mud may include an emulsion that includes aqueous and non-aqueous phases. The drilling mud may also comprise other additives or agents, such as a weighting agent and viscosification agent.

The method also includes forming a filter cake along the face of the wellbore. This is done by continuing to circulate the drilling mud within the wellbore. The filter cake comprises the nano-particles.

Once the wellbore is formed, the drill string may be removed or at least partially withdrawn from the wellbore. This exposes the filter cake across an open-hole portion of the wellbore. The method then includes energizing the nano-particles in the filter cake. This is done using an energy generator that is run into the wellbore on a wireline, coiled tubing, or other working string.

Activating the energy generator at least momentarily energizes the nano-particles. This, in turn, increases the temperature within the filter cake to a temperature that is greater than an initial circulation temperature of the filter cake. The thermal expansion caused by this temperature increase causes a degradation of the filter cake from the radial face.

In one aspect, the energy generator energizes the nano-particles through the application of electromagnetic radiation, or electromagnetic frequency waves. In this embodiment, the energy generator is, for example, a radio-frequency radiation-emitting device or a microwave-emitting device. The wave energy generator may cause the nano-particles within the aqueous phase to become momentarily heated to a temperature that is at least 50° C., or in some aspects at least 100° C., or in some aspects at least 200° C., greater than an initial circulation temperature of the filter cake, thereby creating nano-explosions within the filter cake along the open-hole portion of the wellbore.

In another aspect, the energy generator may be a thermal energy generator. The thermal energy generator energizes the nano-particles through heat conductance. In this embodiment, the thermal energy generator may comprise one or more electrically resistive coils, or a steam generator.

In any of these aspects, the step of applying energy may include running the energy generator into the wellbore, and then activating the energy generator along the open-hole portion of the wellbore. The open-hole portion of the wellbore may be substantially vertical. In this instance, the energy generator is run into the wellbore using a wireline, an electric line, or coiled tubing. Alternatively, the open-hole portion of the wellbore may be oriented at least 30 degrees from vertical, or even horizontal. In this instance, the energy generator is preferably run into the wellbore using coiled tubing, a tractor, or combinations thereof.

A method for stimulating a well is also provided herein. This method involves the stimulation of a wellbore as part of the completion process. The wellbore is being completed through a hydrocarbon-bearing subsurface formation.

In one aspect, the method includes injecting a stimulation fluid into the wellbore. Preferably, the stimulation fluid is an acidic solution that comprises hydrochloric acid, hydrofluoric acid, acetic acid, formic acid, or combinations thereof. The stimulation fluid also comprises nano-particles selected to respond to energy waves. Upon receiving the energy waves, the nano-particles cause the stimulation fluid to become heated.

In some aspects, the stimulation fluid comprises an aqueous phase. The aqueous phase may be, for example, between 5% and 98%, or between about 10% and 80%, or between about 10% and 50% by volume. The nano-particles may be mixed into either phase, but may preferably be mixed into the aqueous phase. The nano-particles preferably comprise metallic nano-particles or carbon nanotubes.

The method also includes further injecting the stimulation fluid into the wellbore so as to at least partially invade the near-wellbore region. The stimulation fluid may also contain a diversion agent to help ensure that the stimulation fluid enters portions of the near-wellbore region having differing permeabilities or even different depths.

The method also includes running an energy generator into the wellbore. The energy generator may be, for example, a radio-frequency radiation-emitting device or a microwave-emitting device. The energy generator is activated and run across a selected hydrocarbon-bearing interval. The method also includes further applying energy to the stimulation fluid in order to activate the nano-particles in the stimulation fluid. Specifically, applying electromagnetic wave energy to the nano-particles creates thermal-expansion and disruption of the rock within the near-wellbore region. This serves to disintegrate or break down a portion of the rock matrix in the near-wellbore formation. The temperature of the stimulation fluid adjacent the selected hydrocarbon bearing interval may be increased by at least 50° C., or at least 100° C., or sometimes by at least 200° C., or sometimes by at least 500° C.

The process of applying energy to the nano-particles within the stimulation fluid will tend to increase the permeability of the rock near the wellbore where the hydrocarbon fluid velocities are highest. This, in turn, will enhance the inflow of hydrocarbons into the wellbore during production. The process may also help to melt and dislodge waxes and asphaltenes within the rock matrix that can otherwise reduce the permeability of the near-wellbore rock matrix.

An apparatus within a wellbore is also provided herein. The apparatus is a filter cake deposited from the circulation of drilling mud. The filter cake first comprises fine clay particles. The clay particles have been deposited along a face of a formation as a result of a drilling operation. Other remaining particles typically represent weighting agent particles and drilled cuttings remaining from the drilling operation. The particles are aggregated into a cylindrical body.

The cylindrical filter cake includes water sometimes in the form of water droplets. The water remains from an aqueous phase in the drilling mud. The cylindrical cake also includes nano-particles. The nano-particles are dispersed within the water. The nano-particles were selected to respond to energy and, upon receiving energy, to substantially disintegrate the filter cake.

Finally, a method of enhancing fluid communication between a wellbore and a surrounding near-wellbore region within a subsurface formation is provided herein. In this method, the fluid communication is impaired by at least one of (i) a first low permeability zone along an inner wall of the wellbore, and (ii) a second low permeability zone in a portion of the near-wellbore region.

The method includes the step of providing nano-particles in at least one of the low permeability zones. The nano-particles are adapted to respond to an application of energy to increase the temperature of the nano-particles. Preferably, energy is provided in the form of electromagnetic frequency waves.

The method further includes energizing the nano-particles in at least one of the low permeability zones. This causes the temperature of the nano-particles to rapidly increase. The rapid temperature increase causes the permeability of at least one of the low permeability zones to increase, thereby increasing fluid communication between the wellbore and the surrounding near-wellbore region.

In one aspect, the method also includes placing a non-ionic fluid within the wellbore. This is done before energizing the nano-particles. The non-ionic fluid helps facilitate the transmission of the electromagnetic frequency waves into one or both of the low permeability zones, thereby energizing the nano-particles.

BRIEF DESCRIPTION OF THE DRAWINGS

So that the present inventions can be better understood, certain drawings, charts, graphs and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1A:
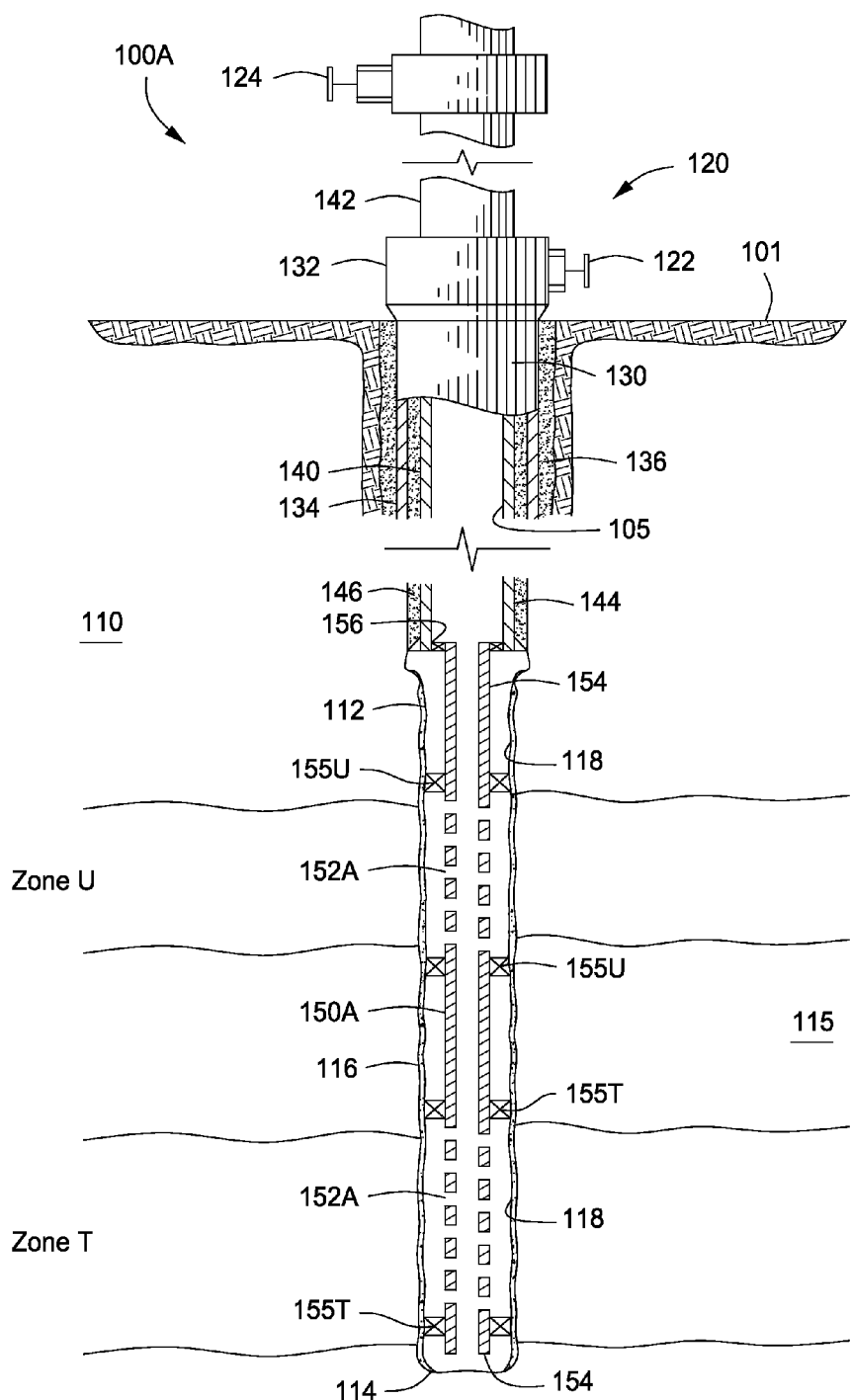
FIG. 1A is a cross-sectional view of an illustrative wellbore. The wellbore has been completed as an open-hole completion. A slotted liner is placed along two hydrocarbon-producing intervals in a subsurface formation.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring, hydrocarbons including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the term "fluid" refers to gases, liquids, and combinations of gases and liquids, as well as to combinations of gases and solids, and combinations of liquids and solids.

As used herein, the term "condensable hydrocarbons" means those hydrocarbons that condense at about 15° C. and one atmosphere absolute pressure. Condensable hydrocarbons may include, for example, a mixture of hydrocarbons having carbon numbers greater than 4.

As used herein, the term "subsurface" refers to geologic strata occurring below the earth's surface.

As used herein, the term "formation" refers to any definable subsurface region. The formation may contain one or more hydrocarbon-containing layers, one or more non-hydrocarbon containing layers, an overburden, and/or an underburden of any geologic formation.

The terms "zone" or "zone of interest" refer to a portion of a formation containing hydrocarbons. The term "hydrocarbon-bearing formation" may alternatively be used.

As used herein, the term "wellbore" refers to a hole in the subsurface made by drilling or insertion of a conduit into the subsurface. A wellbore may have a substantially circular cross section, or other cross-sectional shapes. As used herein, the term "well," when referring to an opening in the formation, may be used interchangeably with the term "wellbore."

As used herein, "disintegration" or "degradation" refers to a breakdown of filter cake into particles. This, in turn, causes the filter cake to be separated from the radial face of a wellbore.

As used herein, the terms "energy source" or "energy generator" encompass any and all forms of excitation or heating, including without limitation thermal energy, ultrasonic energy, electrical energy, and radiation from any or all regions of the electromagnetic spectrum such as radiation which includes (but not limited to) optical (ultraviolet, visible, and infrared light), microwave, and radiofrequency radiation.

As used herein, the term "nano-particles" refers to matter having at least one dimension that is less than about 500 nanometers in diameter and that is subject to an increase in temperature when exposed to radiative energy, acoustic energy, magnetic energy, or conductive energy. A non-limiting example is a carbon nanotube.

The term "tubular member" refers to any pipe, such as a joint of casing, a portion of a liner, or a pup joint.

DESCRIPTION OF SELECTED SPECIFIC EMBODIMENTS

The inventions are described herein in connection with certain specific embodiments. However, to the extent that the following detailed description is specific to a particular embodiment or a particular use, such is intended to be illustrative only and is not to be construed as limiting the scope of the inventions.

Figure 1B:
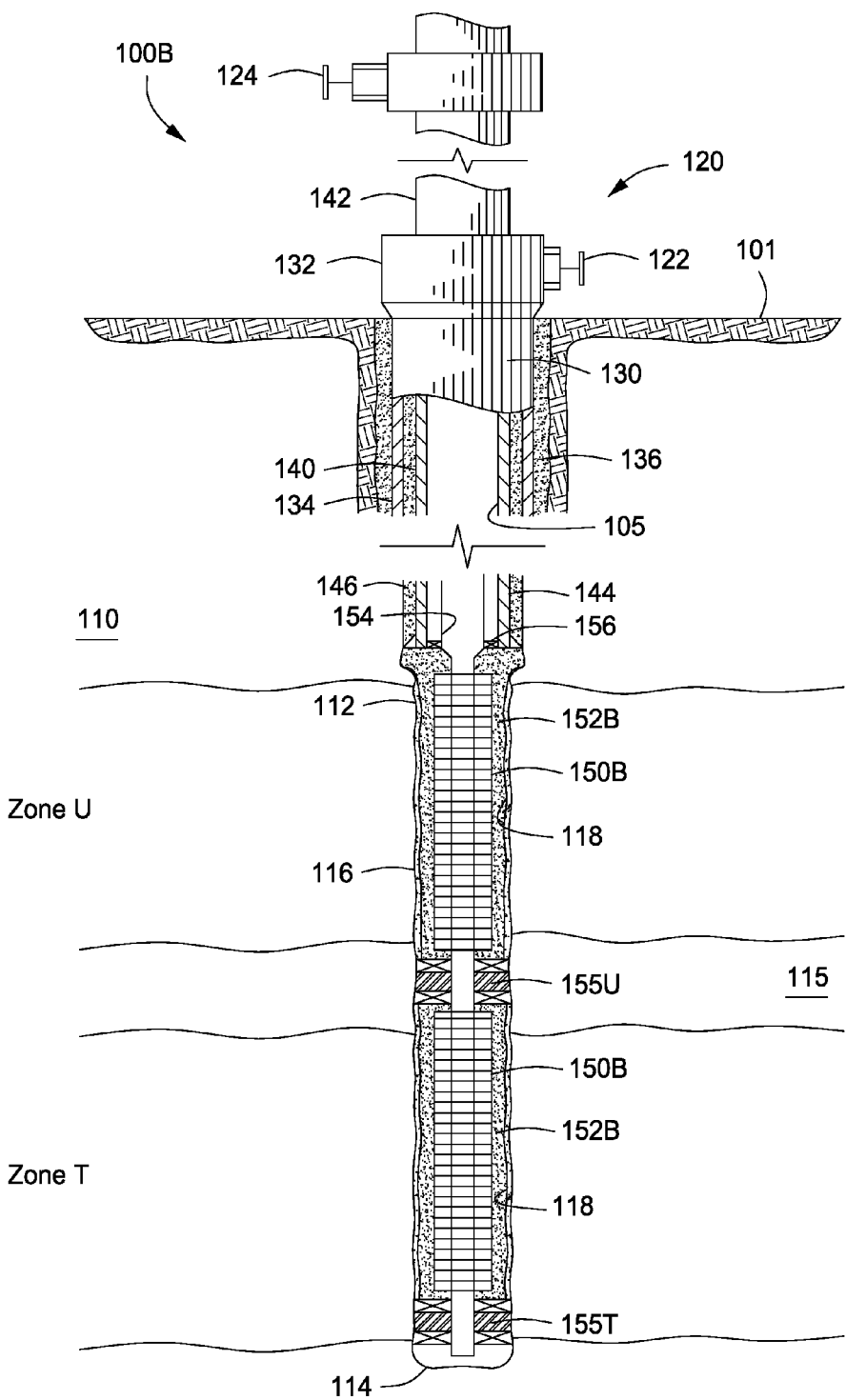
FIG. 1B is a cross-sectional view of an illustrative wellbore. The wellbore has again been completed as an open-hole completion. A sand screen and gravel pack are placed along hydrocarbon-producing intervals.

FIGS. 1A and 1B provide cross-sectional side views of two wellbores 100A, 100B. In each of these views, the top of the drawing page is intended to be toward the surface and the bottom of the drawing page toward the well bottom. While wells commonly are completed in substantially vertical orientation, it is understood that wells may also be inclined and even horizontally completed. When the descriptive terms "up and down" or "upper" and "lower" or similar terms are used in reference to a drawing, they are intended to indicate location on the drawing page, and not necessarily orientation in the ground, as the present inventions have utility no matter how the wellbore is orientated.

In FIGS. 1A and 1B, the wellbores 100A, 100B are being completed as open-hole completions. This means that a string of production casing is not run into the wellbore and cemented into place; instead, a formation face is left exposed along the wellbore.

There are certain advantages to open-hole completions versus cased-hole completions. First, because open-hole completions have no perforation tunnels, formation fluids can converge on the wellbore radially 360 degrees. This has the benefit of eliminating the additional pressure drop associated with converging radial flow and then linear flow through particle-filled perforation tunnels. The reduced pressure drop associated with an open-hole completion virtually guarantees that it will be more productive than an unstimulated cased hole in the same formation.

Second, open-hole completions, including gravel pack techniques, are oftentimes less expensive than cased-hole completions. For example, the use of perforated liners and gravel packs eliminates the need for cementing, perforating, and post-perforation clean-up operations.

Referring for the moment to each of wellbores 100A and 100B together, each of the wellbores defines a bore 105. The bore 105 extends from a surface 101, and into the earth's subsurface 110.

Each of the wellbores 100A, 100B also includes a wellhead 120. The wellhead 120 contains various items of flow control equipment such as a lower master fracturing valve 122 and an upper master fracturing valve 124. It is understood that the wellhead 120 will include additional valves and other components, such as a blow-out preventer, used for completing a well. Once the well is completed, a well tree will be installed for controlling and directing the flow of production fluids.

Each of the wellbores 100A, 100B has been completed by setting a series of pipes into the subsurface 110. These pipes include a first string of casing 130, sometimes known as surface casing or a conductor. The surface casing 130 has an upper end 132 in sealed connection with the lower master fracture valve 122. The surface casing 130 also has a lower end 134. The surface casing 130 is secured in the formation 110 with a surrounding cement sheath 136. The combination of the surface casing 130 and the cement sheath 136 strengthens the wellbore 100A and facilitates the isolation of formations behind the casing 130.

The pipes also include one or more sets of intermediate casing 140. The illustrative intermediate casing 140 also has an upper end 142 in sealed connection with the upper master fracture valve 124. The intermediate casing 140 also has a lower end 144. The intermediate casing 140 is secured in the formation 110 with a surrounding cement sheath 146. It is understood that a wellbore may, and typically will, include more than one string of intermediate casing. Some of the intermediate casing strings may be only partially cemented into place, depending on regulatory requirements and the presence of migratory fluids in any adjacent strata.

Each of the wellbores 100A and 100B has a borehole 116. The borehole 116 has an upper end 112 and a lower end 114. The borehole 116 extends through one or more zones of interest within a subsurface formation 115. In the illustrative wellbores of FIGS. 1A and 1B, the boreholes 116 extend through an upper Zone "U" and down to a lower Zone "T." It is understood that Zones "U" and "T" are merely illustrative. In practice, a wellbore may be completed through multiple zones having different rock matrices and different fluid compositions, and having different reservoir temperatures and pressures.

Referring now specifically to FIG. 1A, as noted, the wellbore 100A is completed as an open-hole completion. To facilitate the flow of fluids into the borehole 116, a slotted liner 150A is provided. The slotted liner 150A helps preserve the integrity of the formation 115 along Zones "U" and "T." This is of particular utility where the formation 115 is a sandstone or other loose or unconsolidated matrix.

The slotted liner 150A has a plurality of pre-drilled holes or slots 152A. The portions of the liner 150A having the slots 152A are placed along Zones "U" and "T." The slots 152A provide a means of fluid communication, allowing valuable hydrocarbon fluids to flow into the borehole 112.

To facilitate the flow of production fluids to the surface 101, a string of production tubing 154 is provided. The production tubing 154 generally resides at the top 112 of the borehole 116. A packer 156 seals the annulus between the production tubing 154 and the surrounding intermediate casing string 140 near the top 112 of the borehole 116. Packer 156 is seen at the lower end 144 of the casing 140.

Zonal isolation devices 155U and 155T are provided around an outer diameter of the slotted liner 150A. In the arrangement of FIG. 1A, the zonal isolation devices 155U and 155T are packers. The packers may be either permanent packers or resettable packers. Packers 155U straddle the upper Zone "U," while packers 155T straddle lower Zone "T."

Referring next to FIG. 1B, the wellbore 100B is also completed as an open-hole completion. In order to facilitate the flow of fluids into the borehole 116, a sand screen 150B is provided. The sand screen 150B helps preserve the integrity of the formation 115 along Zones "U" and "T." This is of particular utility where the formation 115 is a sandstone or other loose or unconsolidated matrix.

The sand screen 150B of FIG. 1B is placed in the borehole 116 with a gravel pack. Gravel packs are shown at 152B. Those of ordinary skill in the art will understand that a gravel pack is installed using a working string that injects a sand slurry. Various bypass valves may be employed along the sand screen to insure that the slurry does not bypass any portions of the sand screen 150B. The present inventions are not limited by the configuration of the sand screen or how it is installed.

To facilitate the flow of production fluids to the surface 101, a string of production tubing 154 is provided. The production tubing 154 is connected to the sand screen 150B. An annular packer 156 prevents the migration of formation fluids behind the production tubing 154.

Zonal isolation devices 155U and 155T are provided around an outer diameter of the sand screen 150B. In the arrangement of FIG. 1B, the zonal isolation devices 155U and 155T are swellable packers. Packers 155U straddle the upper Zone "U," while packers 155T straddle lower Zone "T."

Swellable packers are known, and include at least one swellable packer element fabricated from a swelling elastomeric material. Suitable examples of swellable materials may be found in Easy Well Solutions' CONSTRICTOR™ or SWELLPACKER™, and Swellfix's E-ZIP™. The swellable packer 155 must be able to expand to the wellbore wall and provide the required pressure integrity at that expansion ratio. The swellable packer 155 may be fabricated from a combination of materials that swell in the presence of both water and oil, respectively. Stated another way, the swellable packer element may include two types of swelling elastomers—one for water and one for oil. In this situation, the water-swellable element will swell when exposed to the water-based drilling fluid or formation water, and the oil-based element will expand when exposed to hydrocarbon production.

Swellable elastomeric materials may include, for example, natural rubber; acrylate butadiene rubber; polyacrylate rubber; isoprene rubber; choloroprene rubber; butyl rubber; brominated butyl rubber; chlorinated butyl rubber; chlorinated polyethylene; neoprene rubber; styrene butadiene copolymer rubber; ethylene vinyl acetate copolymer; silicone rubbers; nitrile rubber; and many other swellable elastomeric materials. The swelling elastomeric material may be determined to swell in the presence of one of a conditioned drilling fluid, a completion fluid, a production fluid, an injection fluid, a stimulation fluid, or any combination thereof. However, the present inventions are not limited to the particular design of the packer 155.

It is noted that in both FIGS. 1A and 1B, a filter cake 118 is seen running essentially the length of the borehole 116. Generally, a filter cake will only form across permeable formations, and FIGS. 1A and 1B illustratively assume that the entire open borehole 116 has some permeability. The filter cake 118 defines a thin, cylindrical body formed from the circulation of drilling mud during the drilling process.

In completing the wellbores 100A and 100B for the production of hydrocarbons, the operator may wish to remove the filter cakes 118. Novel methods are employed herein to address these needs. Selected embodiments of these methods are generally set out in FIGS. 2 and 3.

Figure 2:
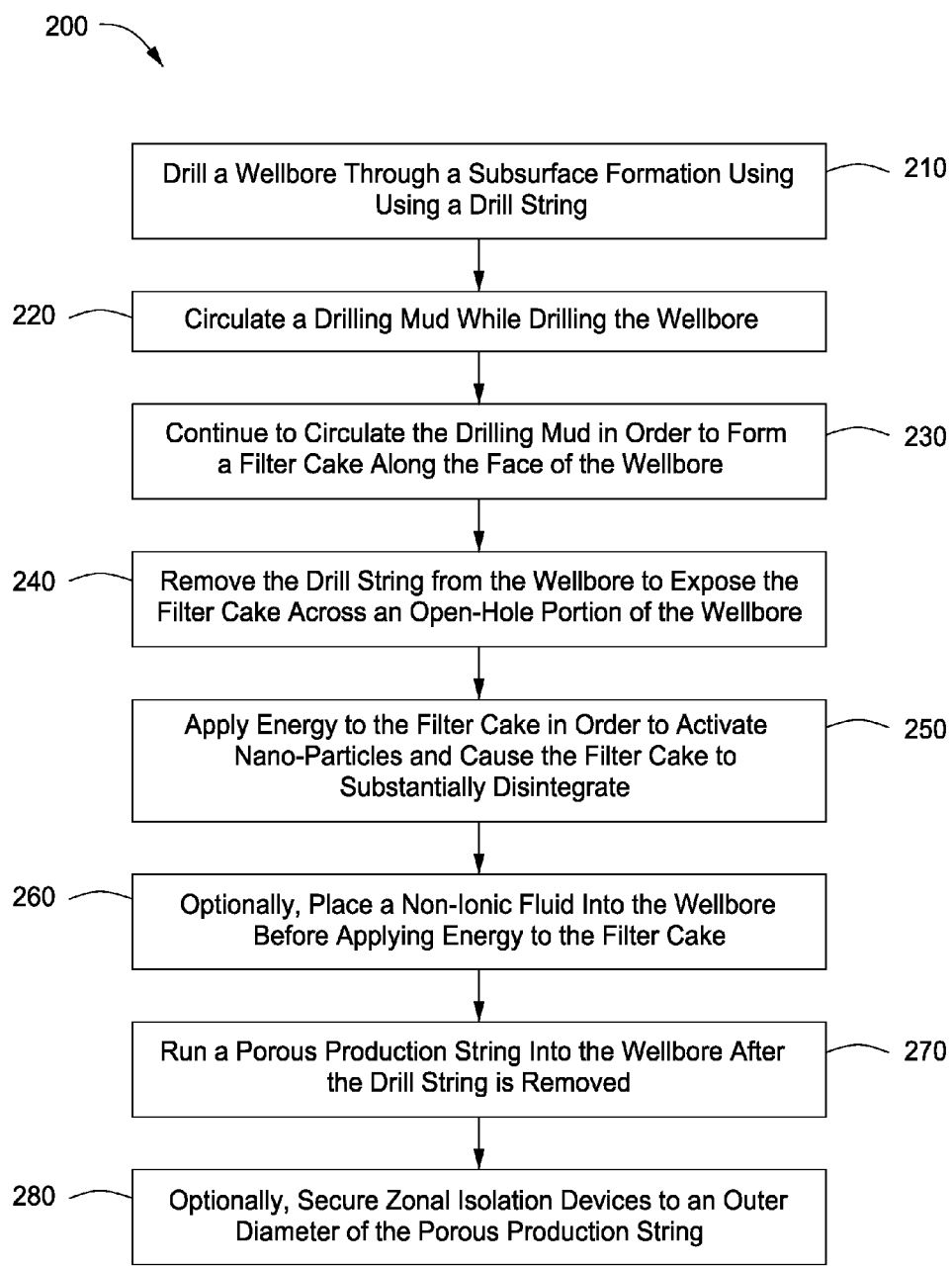
FIG. 2 is a flowchart showing steps of a method for preparing a wellbore in accordance with the present inventions, in one embodiment.

FIG. 2 presents a flow chart for a method 200 for preparing a wellbore. In this method, the well containing the wellbore is completed as an open hole. The method 200 first includes drilling a wellbore through a subsurface formation. This is shown in Box 210. The wellbore is drilled using a drill string. The wellbore defines a radial face.

The method 200 also includes circulating a drilling mud. This is shown at Box 220. The step 220 of circulating a drilling mud is done while drilling the wellbore in step 210. The drilling mud is preferably non-ionic, but may be water-based, non-aqueous, and/or gaseous. Where the drilling mud is non-aqueous, it may comprise diesel oil, mineral oil, a synthetic oil, or combinations thereof. The drilling mud may also comprise a weighting agent, a viscosification agent, and other materials.

The drilling mud also comprises nano-particles dispersed within the drilling mud. The nano-particles are designed to cause substantial disintegration or degradation of the drilling mud in response to an application of energy.

The nano-particles in the drilling mud may comprise, for example, metallic nano-particles. In one aspect, metallic nano-particles are made from gold, and define gold nano-shells. Alternatively or in addition, the nano-particles may be chosen from a group consisting of silver; platinum, titanium, aluminum, copper, zinc, iron, zirconium, tin, and nickel. The metals may also comprise a metal oxide, including iron oxide and titanium oxide.

Alternatively or in addition, the nano-particles may comprise carbon nanotubes. Carbon nanotubes are an allotrope of carbon. A single carbon nanotube is a one-atom thick sheet of graphite, called graphene, which has been rolled into a seamless cylinder. The cylinder may have a diameter of no more than a few nanometers. Carbon nanotubes are extremely strong and conduct heat relatively efficiently. Carbon nanotubes may be single-walled nanotubes or multi-walled nanotubes. In one non-limiting embodiment, a subset of multi-walled nanotubes, called double-walled carbon nanotubes, may be selected.

Preparation of carbon nanotubes that are useful herein may be carried out by any methods known to those skilled in the art. Such methods include, but not limited to, arc discharge, laser ablation, high pressure carbon monoxide (HiPco), and chemical vapor deposition (CVD). For example, a combustion chemical vapor deposition (CCVD) technique may be selected and carried out via the selective, catalyzed reduction of oxide solid solutions in methane and hydrogen. Most of these processes take place in a vacuum or with process gases. If a plasma is generated during CVD, nanotube growth will follow the direction of the electric field, thereby enabling synthesis of vertically aligned nanotubes.

In any material, the nano-particles will each have a diameter that is less than about 1 µm. More typically, the nano-particles each have a diameter that is less than about 5 nm to about 250 nm. The nano particles present in the drilling mud may be, for example, about 0.1% to about 10% by weight.

The drilling mud may also comprise an aqueous phase. The aqueous phase is preferably between about 10% and 50% by volume. Water preferably is not the continuous phase of the drilling mud. The aqueous phase is preferably fresh water rather than brine so that the drilling mud is less ionic. The nano-particles are preferably mixed into the aqueous phase.

The method 200 further includes continuing to circulate the drilling mud in order to form a filter cake along the radial face of the borehole. This is shown at Box 230. Thereafter, the drill string is removed from the wellbore. This exposes the filter cake across an open-hole portion of the wellbore. This is provided at Box 240 of FIG. 2.

The method 200 also includes applying energy to the filter cake. This is provided at Box 250. Energy is applied by actuating an energy generator within the wellbore. The energy generator at least momentarily increases the temperature of the nano-particles within the filter cake, which in turn increases the temperature of the regions within the filter cake in the immediate vicinity of the nano-particles to a temperature that is greater than an initial downhole temperature of the filter cake. This, in turn, energizes the nano-particles so as to cause substantial break down of the filter cake.

The energy generator is preferably an electromagnetic wave emitting device. Non-ionic fluids such as fresh water and oil are known to facilitate the transmission of radio frequency (RF) radiation, or energy. RF waves and microwaves are known to penetrate into rock formations from a wellbore. RF waves generally have a frequency in the range of about 3 kHz to 300 GHz. As a subset, High Frequency waves have a frequency in the range of about 3 MHz to 30 MHz. Microwaves generally have a frequency in the range of about 300 MHz (0.3 GHz) and 300 GHz.

The electromagnetic wave-energy generator may be a microwave emitting device. Microwaves are electromagnetic waves with wavelengths ranging from as long as one meter to as short as one millimeter, or equivalently, with frequencies between 300 MHz (0.3 GHz) and 300 GHz. This broad definition of microwaves includes both UHF and EHF (millimeter waves). In all cases, microwaves include the entire SHF band (3 to 30 GHz, or 10 to 1 cm) at minimum.

The energy generator may cause the nano-particles within the fluid to become momentarily heated to a temperature that is at least 50° C., 100° C., 200° C., or even at least 500° C., greater than an initial downhole temperature of the filter cake, formation, or stimulation temperature, at the relevant pressure, depth, and/or time. This may create localized nano-"explosions,"-reactions (e.g., chemical or physical), -conversions, or -expansions of energy within the filter cake along the open-hole portion of the wellbore. The energy generator, such as a microwave emitting device, may be activated for any suitable period of time, for example between 5 seconds and 10 minutes, or for not greater than 10 seconds, or 30 seconds, one minute, or 10 minutes, depending on the relevant factors, such as for example the wellbore volume which is sought to be affected. The heating is referred to as "temporary" in that after removal of the energizing source or after release of the localized energy, the temperature may be permitted to return back to an ambient temperature for such location. The temperature increase refers to the temperature increase of the fluid and/or particulate media in the vicinity of the heated nano-particles e.g., the temperature of the fluid within the filter cake, stimulation fluid, and/or cement slurry. For example, the temperature of the nano-particles themselves may substantially exceed the temperature increase of the media, such that depending upon the concentration of the nano-particles, the observed or measured temperature of an effected portion of the media in the vicinity of the nano-particles may be observed or measured to be an increase of at least 50° C., 100° C., 200° C., or 500° C., as appropriate. The temperature of the fluid media (e.g., filter cake, etc.) may be measured or determined by any appropriate temperature sensing means an apparatus, although taking wellbore measurement during the operation is likely not needed. Pre-operation calculations or determinations may ascertain the amount of energy needed for a give application and rate of operation.

It is noted here that recent research has shown that nano-particles can be used for localized heating of cancer cells within the body of a mammal. For example, it has been claimed that single wall carbon nanotubes can be heated to temperatures greater than 500° C. in one second using microwave radiation. This may have promising application in the selective destruction of cancer cells, such as breast cancer cells in female humans. Handheld microwave devices have apparently been used to cure single-wall carbon-nanotube-laced epoxy in connection with the repair of space shuttle tiles. Information available to the inventor states that the epoxy was cured in about six minutes using microwave radiation at about 50 W.

It is believed that within the radio-frequency portion of the electromagnetic spectrum, high-frequency (HF) waves offer the best approach for rapidly heating a near-wellbore region. These would be waves at 3 MHz to 30 MHz. HF radiation has been shown to thermally activate some types of nanoparticles in medical applications. See, e.g., S. Curley, et. al., Journal of Experimental Therapeutics and Oncology, Vol. 7, pp. 313-26 (2008). HF waves are capable of penetrating through certain liquids and solids with less attenuation than higher frequency radiation. Such waves have historically been used for short-wave broadcasts and amateur radio. However, depending on the length of time in which the energy generator is to be activated, higher bands such as the Very High Frequency (VHF) bands may be used. VHF waves operate at 30 to 300 MHz.

In one embodiment, the radio-frequency emitting device is a so-called maser (microwave amplification by stimulated emission of radiation). A maser is a device that produces coherent electromagnetic waves through amplification by stimulated emission. Contemporary masers emit EM waves (microwave and radio frequencies) across a broad band of the electromagnetic spectrum.

In any event, the energy generator temporarily activates nano-particles that increase the temperature within the filter cake media to a temperature that may be 50° C., 100° C., or 200° C., or more greater than an initial (e.g., ambient) downhole temperature of the filter cake media. This, in turn, may trigger sudden destruction of the heated nano-particles (which may in fact be at a temperature substantially higher than the temperature of the filter cake media) which in turn may cause disintegration or degradation of the integrity of the filter cake (which may also include degradation and/or removal of near-wellbore skin damage and/or formation leak-off zone). In operation, as the nano-particles are rapidly heated, the nano-particles cause the structure of the filter cake to be disrupted. This may occur, for example, through the rapid vaporization of small water droplets in the filter cake, creating pressures from thermal energy confinement that lead to nano-explosions. These explosions, in turn, break up the filter cake and prevent any future chances of plugging of downhole hardware during hydrocarbon production.

In another aspect, the energy generator may be a thermal energy generator. The thermal energy generator energizes the nano-particles through heat conductance. In this embodiment, the thermal energy generator may comprise for example one or more electrically resistive coils or a steam generator.

In either aspect, applying energy comprises running an energy emitting device into the wellbore, and then activating the energy emitting device along the open-hole portion of the wellbore. The open-hole portion of the wellbore may be substantially vertical. In this instance, the energy generating device is run into the wellbore using a wireline, an electric line, or coiled tubing. Alternatively, the open-hole portion of the wellbore may be oriented at least 30 degrees from vertical, or may even be substantially horizontal. In these instances, the energy generating device is preferably run into the wellbore using coiled tubing or a tractor.

The method 200 may optionally include placing a non-ionic fluid into the wellbore across the open-hole portion of the wellbore before applying thermal energy to the filter cake. This is provided at Box 260. Internal testing has shown that RF energy is much less attenuated by a non-ionic fluid than by aqueous fluids, particularly ionic aqueous fluids. Placing the non-aqueous fluid into the wellbore may simply involve producing crude oil from a hydrocarbon producing zone for a time. Alternatively, the step 260 of placing the non-ionic fluid into the wellbore may involve circulating a non-ionic fluid such as a SBM into the open-hole portion, such as through coiled tubing. In any event, the step of placing a non-ionic fluid into the wellbore is preferably used when an aqueous drilling mud is used, Where the energy generator is an RF-emitting (or other penetrating radiative energy) device, the non-ionic fluid is preferably an oil-based fluid which will not significantly attenuate the radio frequency signals. Suitable oils for an oil-based fluid include linear paraffins (alkanes), isoparaffins, terpenes, diesel, mineral oil, synthetic oil, organic oil, and olefins (especially linear olefins). Suitable organic oils include soybean oil, corn oil, pine or pinus oil, hemp oil, needle oil, and tea tree oil. Alternatively, the non-ionic fluid may be selected from a variety of polyols. Preferably the polyols are selected from the group consisting of glycerol, glycols, polyglycols and mixtures thereof. The glycols include commonly known glycols such as ethylene glycol, propylene glycol and butylene glycol.

The method may also include running a porous production string into the wellbore. This is shown at Box 270. The porous production string is run into the wellbore after the drill string is removed. The porous production string may comprise, for example, a slotted liner (as shown in FIG. 1A) or a sand screen (as shown in FIG. 1B). The method may also include securing zonal isolation devices to an outer diameter of the porous production string. This is shown at Box 280. The zonal isolation devices may be, for example, swellable packers. The zonal isolation devices straddle a selected hydrocarbon-producing zone, and keep wellbore fluids from migrating behind the production string and commingling within subsurface strata.

Figure 3:
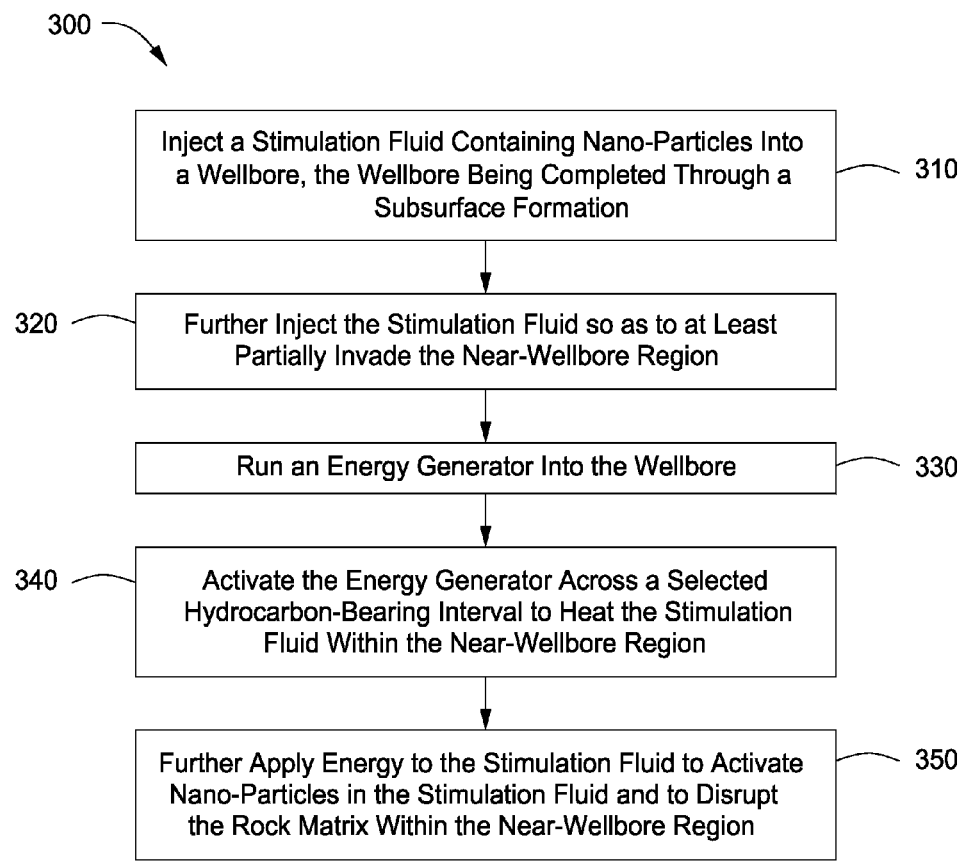
FIG. 3 is a flowchart demonstrating steps of a method for preparing a wellbore in accordance with the present inventions, in yet another alternate embodiment.

A method for stimulating a well using nano-particles is also disclosed herein. This method is generally presented in FIG. 3. FIG. 3 provides a flow chart for the method 300 for stimulating a well.

The method 300 first includes injecting a stimulation fluid into a wellbore. This is provided in Box 310. The wellbore has been formed through a subsurface formation. The subsurface formation includes at least one hydrocarbon-bearing interval.

The stimulation fluid comprises nano-particles. The nano-particles are selected to respond to electromagnetic wave energy. This means that electromagnetic wave energy excites the nano-particles and causes the stimulation fluid to become rapidly heated.

The stimulation fluid is preferably an acidic solution. In one aspect, the stimulation fluid comprises about 10% to 100% by volume hydrochloric acid, hydrofluoric acid, acetic acid, or formic acid. The stimulation fluid may also include an aqueous phase. In one aspect, the aqueous phase is between about 10% and 50% by volume. The aqueous phase preferably is fresh water, with the nano-particles being mixed into the aqueous phase. In one aspect, the stimulation fluid is substantially non-ionic.

The stimulation fluid may optionally include a diversion agent. The diversion agent may be, for example, a foam or organic particles. The diversion agent helps ensure that the stimulation fluid enters portions of the near-wellbore region having differing permeabilities.

The method 300 also includes further injecting the stimulation fluid into the wellbore. This is provided in Box 320. This further injecting step of Box 320 causes the stimulation fluid to at least partially invade the near-wellbore region. This allows the stimulation fluid to come into contact with the rock matrix and at least partially fill rock pores.

The method 300 further includes running an energy generator into the wellbore. This is shown in Box 330. The energy generator is preferably an electromagnetic wave emitting device, particularly if the wellbore is completed as an open hole, that is, without a string of production casing. For example, the EM device may be a radio-frequency wave- or a microwave-emitting device. However, other energy generators may be utilized, such as electrically resistive coils or a steam generator that create thermal energy.

The method 300 also includes activating the energy generator across the selected subsurface interval. This causes the nano-particles within the stimulation fluid to be excited, thereby heating the stimulation fluid.

The method 300 next includes further applying energy to the stimulation fluid. This step is shown at Box 350. Applying further energy causes additional heating of the stimulation fluid so as to activate the nano-particles in the stimulation fluid along the one or more selected hydrocarbon-bearing intervals. In one aspect, activating the energy generator causes the stimulation fluid within the near-wellbore region across the selected hydrocarbon-bearing interval to be heated to a temperature that is at least 100° C. greater than a temperature of the near-wellbore region before the energy generator was activated. This heating aids in breaking up the rock matrix via thermal expansion within the near-wellbore region. The heating may also help dislodge wax and asphaltene deposits that are blocking the permeability in the critical near-wellbore region. The heating may also help break up remaining drilling mud in the rock pores near the wellbore face.

In one aspect, the energy generator causes the stimulation fluid within the near-wellbore region across the selected hydrocarbon-bearing interval to be heated to a temperature that is at least 200° C., or even at least 500° C., greater than a temperature of the near-wellbore region before the thermal energy generator was activated. This, in turn, creates nano-explosions within the near-wellbore region. To accomplish the nano-explosions, it is preferred that the energy generator emit radio-frequency waves or microwaves.

It is understood that other forms of energy and other types of energy emitting devices may be used to excite the nano-particles. As noted above, such forms may encompass thermal energy, ultrasonic energy, electrical energy, and radiation from any or all regions of the electromagnetic spectrum such as radiation which includes (but not limited to) optical (ultra-violet, visible, and infrared light), microwave, and radiofrequency radiation.

The disintegrating filter cake and the methods described above offer benefits and advantages over existing operations. For example, attempts have previously been made at designing a drilling mud that forms a filter cake having a so-called low lift-off pressure. The lift-off pressure is the pressure required to induce the filter cake to at least partially lift off the wellbore face when the well is first put on production. Low lift-off pressures have been achieved by tailoring the composition of the drilling mud so that the filter cake is more easily removed. The low lift-off pressure will be lower than the initial operating pressure of the formation near the wellbore.

While having a low lift-off pressure is desirable to permit hydrocarbon fluids to flow into the well and to the surface, this arrangement can actually inhibit production. In this respect, if a large percentage of the filter cake lifts off during production, the filter cake may substantially plug off a completions screen or other downhole equipment.

Another approach that has sometimes been attempted is to incorporate breakers in the filter cake. Breakers are chemicals that can cause elements of the filter cake to disintegrate after a period of time. Often, the breakers attack polymers within the drilling fluid composition that are used for filtration or viscosity control. The chemical that serves as the breaker is designed to not disrupt the filter cake until after the well is drilled and completed.

While using a material that causes the filter cake to disintegrate has appeal, an inherent challenge with the breaker is making sure that it does not prematurely activate. If the breaker acts too early, fluid-loss control in the wellbore during drilling can be compromised. This can result in deep formation damage at best, and a loss of fluids during drilling at worst. A loss of fluids can create a risk of a blow-out with the well. Also, it is believed that breakers may have temperature limitations, meaning that they may not cause a disintegration of the target polymers if the downhole temperature is too high. Finally, it is again noted that if a large percentage of the filter cake lifts off during production, the filter cake may substantially plug off a completions screen or other downhole equipment Finally, and as noted above, operators have oftentimes used an acid wash to remove filter cake from a wellbore. Typically, this is first done by using a drilling mud having an acid-soluble material in the thickening agent, such as calcium carbonate. After the well is drilled to total depth, an acid solution is circulated through the wellbore. The acid solution at least partially dissolves and removes the filter cake. This is particularly effective when the formation comprises carbonate rock, as the acid solution will help clean out fine, near-wellbore rock particles as well, thereby opening up porous channels through which hydrocarbon fluids may flow into the wellbore.

While the acid wash represents a conventional procedure, it can be difficult to ensure that the acid wash actually contacts and removes all of the filter cake before the well is placed on-line. Typically, the acid will follow a fluid flow path of least resistance and not contact a significant portion of the filter cake. Further, the circulation of acid requires corresponding equipment, such as a coiled tubing unit.

The above improved disintegrating filter cake and methods for preparing or for stimulating a wellbore help to address the above shortcomings. For example, applying EM waves to a filter cake containing single wall nano-tubes can cause the nano-tubes to become superheated, creating small nano-explosions within water droplets bound within the filter cake. This allows the filter cake to be substantially disintegrated.

The above-described filter cake apparatus and related methods for removing a filter cake have particular application for open-hole completions. In these completions, a string of casing is not cemented into the wellbore along the production zones; rather, the well employs a pre-perforated liner, a sand screen, or sometimes even no tubular object at all. However, the use of nano-particles may also be used in the context of a cased-hole completion. In this instance, nano-particles are dispersed within a cement slurry to aid in controlling curing of the cement while forming the cement sheath.

FIG. 1A and FIG. 1B, discussed above, each show an illustrative cement sheath 146 around an intermediate casing string 140. However, no cement sheath is shown below the intermediate casing string 140 as the wellbores 100A, 100B are completed with open holes along Zones "U" and "T." FIG. 4 is offered to demonstrate a wellbore 400 that is completed as a cased-hole.

Figure 4:
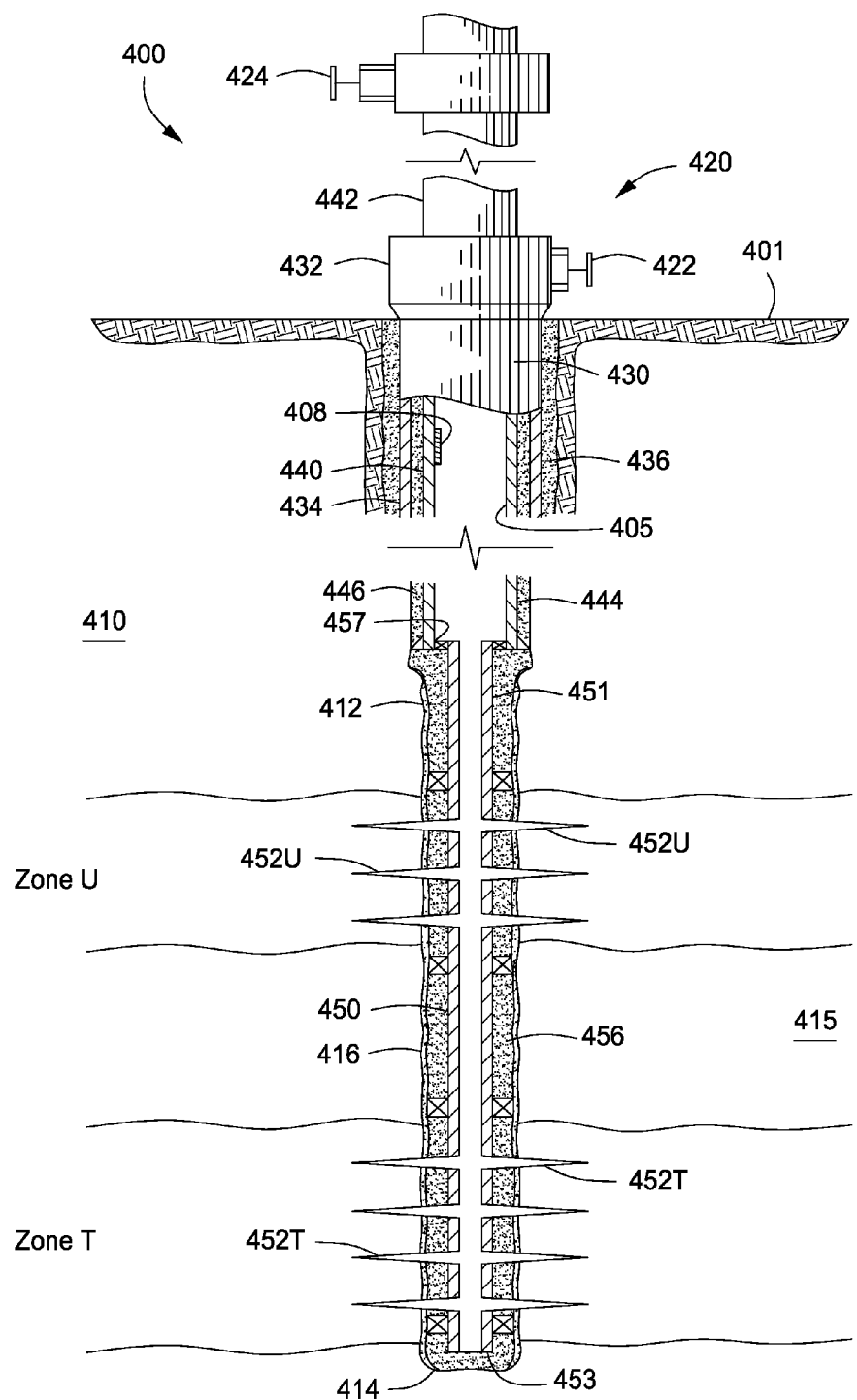
FIG. 4 is a cross-sectional view of an illustrative wellbore. The wellbore has been completed with a string of production casing. The production casing is perforated along hydrocarbon-producing intervals.

FIG. 4 provides a cross-sectional side view of the wellbore 400. The wellbore 400 has been completed by setting a series of pipes into a subsurface 410. These pipes include a first string of casing 430, or surface casing. The surface casing 430 has an upper end 432 in sealed connection with the lower master fracture valve 422. The surface casing 430 also has a lower end 434. The surface casing 430 is secured in the formation 410 with a surrounding cement sheath 436. The combination of the surface casing 430 and the cement sheath 436 strengthens the wellbore 400 and facilitates the isolation of formations behind the casing 430.

The pipes also include one or more sets of intermediate casing 440. The illustrative intermediate casing 440 also has an upper end 442 in sealed connection with the upper master fracture valve 424. The intermediate casing 440 also has a lower end 444. The intermediate casing 440 is secured in the formation 410 with a surrounding cement sheath 446. It is understood that a wellbore may, and typically will, include more than one string of intermediate casing. Some of the intermediate casing strings may be only partially cemented into place, depending on regulatory requirements and the presence of migratory fluids in any adjacent strata.

The wellbore 400 has a borehole 416. The borehole 416 has an upper end 412 and a lower end 414. The borehole 416 extends through one or more zones of interest within a subsurface formation 415. In the illustrative wellbore of FIG. 4, the borehole 416 again extends through an upper Zone "U" and down to a lower Zone "T." It is understood that Zones "U" and "T" are merely illustrative. In practice, a wellbore may be completed through multiple zones having different rock matrices and different fluid compositions, and having different reservoir temperatures and pressures.

The wellbore 400 is completed with a string of production casing 450. The production casing 450 is referred to as a "liner" since it is not tied back to the wellhead 420. Instead, the production casing 450 is hung from the lower end 444 of the intermediate casing 440 using a liner hanger 457. However, a full production casing could be used in the wellbore 400 in lieu of the liner 450. In either instance, the illustrative production casing 450 is set in the subsurface formation 415 using a cement sheath 456.

The production string 450 has an upper end 451. The production string 450 also has a lower end 453. The production string 450 has been perforated between the upper 451 and lower 453 ends. Perforations in Zone "T" are seen at 452T, while perforations in Zone "U" are seen at 452U. The perforations 452U, 452T provide fluid communication between the subsurface formation 415 and the inner diameter of the production casing 450.

In the case of any of the cement sheaths 436, 446, 456, having a good cement job is important in maintaining the integrity of the well 400. A significant factor in providing a good cement job is cement hydration. In this respect, the cement needs to remain moist during the pumping procedure so that it does not set before filling the annular region around the casing. At the same time, the cement should not be overly saturated as it may not harden with sufficient strength. Further, an overly saturated cement slurry takes longer to cure.

Cement hydration is influenced by downhole temperature. An increase in temperature generally accelerates curing time. Therefore, it is desirable to sufficiently saturate the cement so that it does not dehydrate during pumping, but instead remains in slurry form until the cement is in place behind a casing wall. Stated another way, the drilling engineer needs to fully circulate a cement slurry into the wellbore annulus without fear of premature setting.

It is noted that cement de-hydration is an exothermic reaction. As the cement slurry dries en route to the bottom of the well, the downhole temperature increases, which then further dries the cement, and so on. Therefore, it is desirable for the drilling engineer to increase the water content of the cement slurry to maintain a lower temperature, while still being able to obtain a rapid curing once the slurry is in place. Alternatively, a chemical retardant may be used to inhibit or delay curing of the cement.

Once the cement is in place, it is desirable for the cement to rapidly cure. This reduces the cost of drilling. Those of ordinary skill in the art will be familiar with the phrase "waiting on cement," meaning that idle rig time is being consumed while the cement is setting.

There is a need for an additive that allows the drilling engineer (or drilling superintendent) to control the temperature of a cement slurry. In accordance with the inventions herein, a volume of nano-particles is used as an additive. The nano-particles are heat-sensitive. Preferably, the nano-particles are single-walled carbon nano-tubes (SWNTs).

In operation, the drilling engineer (or drilling superintendent) will circulate a drilling mud through the drill string and up the annulus at the maximum rate possible. This conditions the mud to create a filter cake and provides needed hydrostatic head within the wellbore. Then, the string of casing is run into the wellbore. With the casing in the hole, cement pumps are connected to the casing. This is preferably done as quickly as possible.

Next, the drilling engineer (or drilling superintendent) will break circulation with the cement. Breaking circulation means that pumps are re-started to impose circulation of the cement slurry into the casing and back up the back side, or annulus. Those of ordinary skill in the art will understand that cement slurries can thicken or congeal during a period of no circulation. High pump pressure is usually required to start the pumps back up after a period of static conditions. A wiper plug is then dropped.

Next, nano-particles are mixed into the cement slurry. Any other cement additives needed to achieve desired material properties may be added to the cement slurry as well. The cement slurry will then be pumped, preferably at the maximum feasible rate Once the cement slurry is in place behind the target casing string, the nano-particles will be excited through an application of energy. Different techniques may be employed for exciting or energizing the nano-particles. In one aspect, the energy represents thermal energy which is imparted through the use of a downhole heater. The downhole heater is deployed into the wellbore on a wireline or with coiled tubing. The downhole heater is activated to generate resistive heat through the use of electrically conductive coils. The downhole heater is then raised or otherwise translated across the depth of the wellbore where the fresh cement has been placed.

Figure 5:
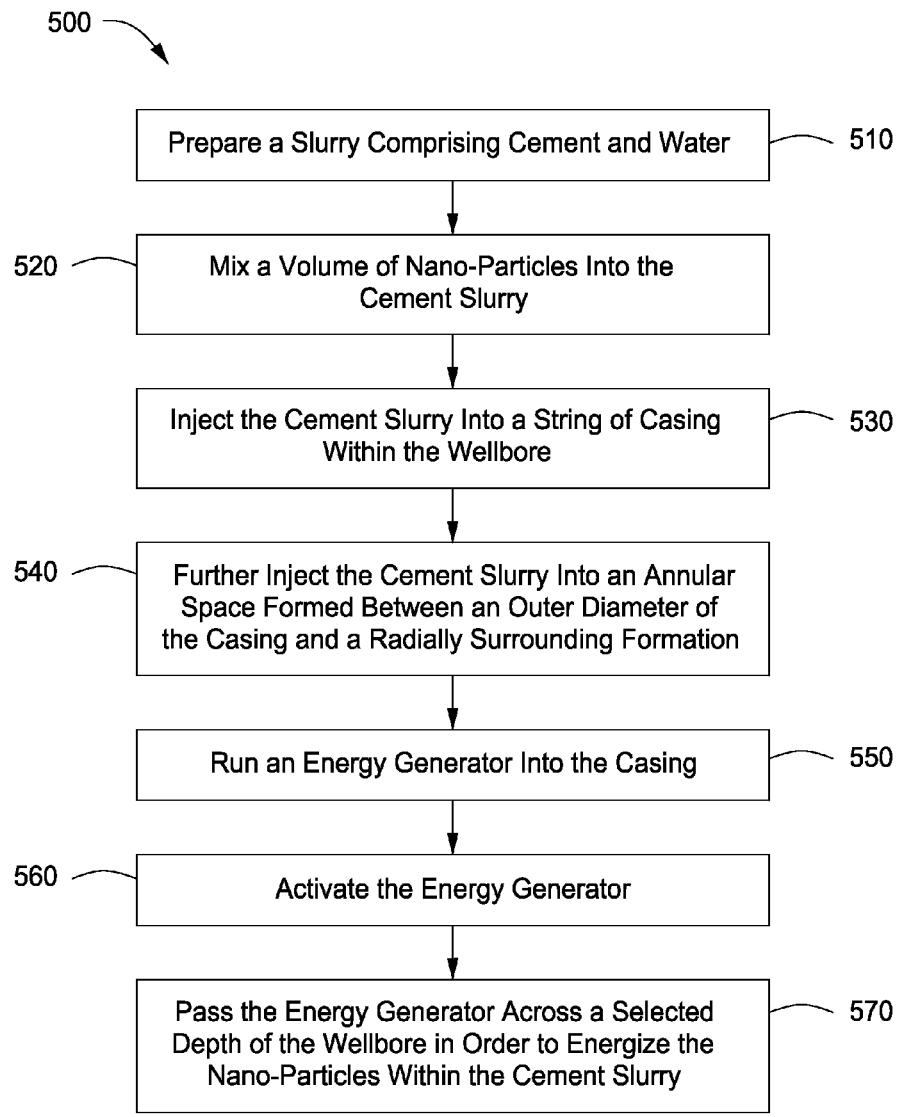
FIG. 5 is a flowchart demonstrating steps of a method for placing cement within a wellbore, in one embodiment. The cement includes nano-particles.

FIG. 5 provides a flowchart for a method 500 of placing cement within a wellbore. The method 500 first includes preparing a slurry. This is shown at Box 510. The slurry comprises cement and water. Sand or other additives may also be used. The method 500 also includes mixing a volume of nano-particles into the cement slurry. This is seen at Box 520. The nano-particles preferably comprise carbon, single-walled nano-tubes.

The method 500 also includes injecting the cement slurry into a string of casing within the wellbore. This is shown at Box 530. The step of Box 530 typically involves connecting a hose from a cement mixer, and breaking circulation using pumps. The method 500 then includes further injecting the cement slurry into an annular space formed between an outer diameter of the casing and the surrounding formation. This is indicated at Box 540.

It is noted that the injecting step of Box 540 may be applied either before or after the well is completed. Typically, the step of Box 540 takes place shortly after a string of casing has been run into the wellbore. In this instance, injecting the cement slurry into the annular space comprises pumping the cement slurry to a bottom of the wellbore and back up the annular space. The string of casing may be, for example, a string of production casing. In this instance, the surrounding formation comprises a rock matrix having hydrocarbon fluids. However, the step of Box 540 may be practiced for a wellbore that has been in production for a period of time. In this instance, the casing has an opening in a side wall that represents a leak. Injecting the cement slurry into the annular space then comprises squeezing the cement through the opening in the casing.

The method 500 also includes running an energy generator into the casing. This is provided at Box 550. The method 500 then includes activating the energy generator. This is seen at Box 560. After the energy generator is activated, the energy generator is passed across a selected depth of the wellbore. This is indicated at Box 570. This serves to energize the nano-particles within the cement slurry. In one aspect, energizing the nano-particles increases a temperature of the cement slurry within the annular space by at least 100° C. greater than an initial injection temperature of the cement slurry.

The energy generator may be a thermal energy generator. For example, the thermal energy generator may employ one or more resistive coils. In this instance, energizing in accordance with Box 570 comprises heating the nano-particles through the application of thermal energy. The downhole heater may increase the temperature of the wellbore across the area being cemented by at least 100° C., and preferably by at least 150° C., or even by at least 500° C. This heating will heat the casing, which in turn conducts heat into the cement slurry. The heat activates the nano-particles to absorb thermal energy, and increase the temperature of the cement. This causes the cement to set more quickly. In a cementing application is may be preferably to control the heating so as not to cause the explosive or destructive energy releases, to avoid damaging the integrity of the cement job and bond, but instead to merely facilitate improved localized heating to accelerate cement curing time.

In another embodiment, the energy generator is an acoustic energy generator. In this instance, energizing in accordance with Box 570 comprises heating the nano-particles through the application of acoustic energy. The energy generator is deployed into the wellbore on a wireline (which includes an electric line) or on coiled tubing that is run into the casing. The acoustic (or sonic) energy penetrates through the casing and into the cement slurry. The nano-particles within the cement slurry are energized, causing them to rapidly generate heat within the annulus.

It is understood that in any of these techniques, the wireline or other working string will need to be translated through the wellbore fairly quickly to prevent the downhole energy generator from becoming set within the wellbore cement. Should the heater become set, then it can be milled out with the cement. Preferably, the wellbore contains primarily aqueous fluid that is used to push the wiper plug behind the cement.

In accordance with standard completion procedures, the casing may be reciprocated and/or rotated once the pipe is on bottom and cement circulation begins. This may continue until the cement wiper plug has been bumped at the shoe.

Using this process, the drilling engineer, drilling superintendent, or other operator may control the temperature of the cement slurry. If the operator wishes to heat the slurry and expedite curing, then a suitable generator may be deployed for energizing the nano-particles. A greater degree of energy and/or a greater volume of nano-particles will cause a more rapid generation of heat, and a corresponding greater temperature increase. If the operator wishes to delay curing, then the operator may delay application of energy through the downhole energy generator. In addition, the operator may increase the water cut in the slurry to maintain a cooler temperature in the cement slurry until such time as the energy generator is activated. This may be of benefit where a particularly long or deviated section of casing is being cemented.

The above process has application not only in the completion of wells, but also in the remediation of damaged wells. In this respect, a cement slurry having nano-particles may be placed around corroded or otherwise damaged casing during a squeeze job. In addition, the cement slurry may be placed around casing in a sidetrack wellbore off of a primary wellbore.

Using nano-particles in accordance with the above process offers benefits over known accelerants and retardants. In current processes, cement reactions are controlled by using chemicals that help to selectively retard or accelerate the setting of cement. Common retardants include organic additives such as calcium lignosulfonates; common accelerators include inorganic salts such as calcium chloride. These additives can either retard or accelerate, depending on concentration. However, these additives can have unwanted side effects such as foaming, reduced durability of set cement, and decreased resistance to attack by acid gases. Beneficially, the single-walled nano-tube additives are chemically inert in a cement-water mix, and yet convert energy into heat very efficiently.

Based on the above disclosure, the following methods are provided:

1. A method of heating a flowable material within a wellbore, the flowable material comprising nano-particles, and the method comprising:
   placing the flowable material comprising nano-particles in proximity to a radial wall of a wellbore along a selected depth;
   running an energy generator into the wellbore; and
   activating the energy generator while passing the energy generator along the selected depth in order to energize the nano-particles within the flowable material;
   wherein, energizing the nano-particles temporarily increases a temperature of the flowable material by at least 50° C. greater than an initial placement temperature of the flowable material along the radial wall.

2. The method of paragraph 1, wherein the nano-particles comprise metallic nano-particles or carbon nano-tubes.

3. The method of paragraph 1, wherein:
   the flowable material is a drilling mud having the nano-particles dispersed therein;
   placing the flowable material in proximity to a radial wall of a wellbore comprises drilling a wellbore through a subsurface formation using a drill string, the wellbore defining a radial face, and circulating the drilling mud while drilling the wellbore; and
   the method further comprises forming a filter cake comprising the nano-particles along the radial face of at least a portion of the wellbore while circulating the drilling mud.

4. The method of paragraph 3, further comprising:
   at least partially withdrawing the drill string from the wellbore to expose the filter cake across an open-hole portion of the wellbore; and
   wherein energizing the nano-particles comprises energizing the nano-particles in the filter cake to increase a temperature within the filter cake to a temperature that is greater than an initial circulation temperature of the filter cake and to cause substantial degradation of the filter cake from the radial face.

5. The method of paragraph 4, wherein:
   the drilling mud is a non-aqueous fluid that comprises an aqueous phase that is between about 10% and 50% by volume; and
   the method further comprises mixing the nano-particles into the aqueous phase.

6. The method of paragraph 4, wherein energizing energizes the nano-particles through the application of electromagnetic frequency waves.

7. The method of paragraph 6, wherein:
   the energy generator is a radio-frequency radiation emitting device or a microwave emitting device; and
   energizing causes the nano-particles within the aqueous phase to become heated at least momentarily to a temperature that is at least 200° C. greater than an initial circulation temperature of the filter cake, thereby creating nano-explosions within the filter cake along the open-hole portion of the wellbore.

8. The method of paragraph 4, wherein:
   energizing energizes the nano-particles through the application of electromagnetic frequency waves; and
   the method further comprises placing a non-ionic fluid within the wellbore across the open-hole portion of the wellbore before energizing the nano-particles to facilitate the transmission of the electromagnetic frequency waves.

9. The method of paragraph 3, wherein the filter cake comprises:
fine clay particles defining a cylindrical body, the clay particles having been deposited along a face of a formation as a result of the drilling of the wellbore;
water, the water remaining from the aqueous phase of the drilling mud that was circulated during the drilling operation; and
nano-particles dispersed within the water, the nano-particles being selected to respond to energy and, upon receiving energy, to substantially disintegrate the filter cake.

10. The method of paragraph 1, wherein:
the wellbore is completed through a hydrocarbon-bearing subsurface formation;
the flowable material is a stimulation fluid having nano-particles dispersed therein selected to respond to energy waves, and upon receiving energy waves, to become heated;
placing the flowable material in proximity to a radial wall of a wellbore comprises injecting the stimulation fluid into the wellbore;
further injecting the stimulation fluid into the wellbore so as to at least partially invade a near-wellbore region; and
activating the energy generator comprises activating the energy generator across a selected hydrocarbon-bearing interval, thereby exciting the nano-particles and heating the stimulation fluid within the near-wellbore region to create thermal expansion and disruption within a rock matrix in the near-wellbore region.

11. The method of paragraph 10, wherein:
the energy generator is an electromagnetic wave energy generator; and
activating the wave energy generator causes the stimulation fluid within the near-wellbore region across the selected hydrocarbon-bearing interval to be heated to a temperature that is at least 100° C. greater than a temperature of the near-wellbore region before the thermal energy generator was activated.

12. The method of paragraph 11, wherein:
the stimulation fluid is a substantially non-ionic fluid; and
the stimulation fluid further comprises hydrochloric acid, hydrofluoric acid, or formic acid.

13. The method of paragraph 1, wherein:
the flowable material comprises a cement slurry;
the method further comprises preparing a cement slurry comprising cement and water, mixing a volume of nano-particles into the cement slurry, injecting the cement slurry into a string of casing within the wellbore, and further injecting the cement slurry into an annular space formed between an outer diameter of the casing and a radially surrounding formation;
running an energy generator into the wellbore comprises running the energy generator into the casing; and
activating the energy generator comprises activating the energy generator while passing the energy generator across a selected depth of the wellbore in order to energize the nano-particles within the cement slurry.

14. The method of paragraph 13, wherein:
the casing has an opening in a side wall; and
further injecting the cement slurry into the annular space comprises squeezing the cement through the opening in the casing.

15. The method of paragraph 13, wherein:
further injecting the cement slurry into the annular space comprises pumping the cement slurry to a bottom of the wellbore and back up the annular space.

16. The method of paragraph 15, wherein:
the string of casing is a string of production casing; and
the surrounding formation comprises a rock matrix having hydrocarbon fluids therein.

17. The method of paragraph 13, wherein:
the energy generator is a thermal energy generator; and
energizing comprises heating the nano-particles through the application of conductive heat.

18. The method of paragraph 1, wherein:
wherein, energizing the nano-particles temporarily increases a temperature of the flowable material by at least 100° C. greater than an initial placement temperature of the flowable material along the radial wall.

While it will be apparent that the inventions herein described are well calculated to achieve the benefits and advantages set forth above, it will be appreciated that the inventions are susceptible to modification, variation and change without departing from the spirit thereof.

What is claimed is:

1. A method for preparing a wellbore, the method comprising:
drilling a wellbore through a subsurface formation using a drill string, the wellbore defining a radial face;
circulating a drilling mud while drilling the wellbore, the drilling mud comprising clay particles that form a filter cake along the radial face of the wellbore within the wellbore;
dispersing chemically inert nano-particles within at least one of the drilling mud and a completion fluid, the nano-particles dispersed within at least a portion of the filter cake comprising the nano-particles along the radial face; and
running into the wellbore an energy generator that emits at least one of radio-frequency waves, electromagnetic, and microwaves; and
energizing the nano-particles in the filter cake with the energy generator to increase a temperature within the filter cake in proximity to the energy generator to a temperature that causes the nano-particles to at least one of explosively self-destruct or create an explosive phase transition of a fluid in contact with the nano-particles to cause degradation of the filter cake along the radial face.

2. The method of claim 1, further comprising:
at least partially withdrawing the drill string from the wellbore to expose the filter cake across an open-hole portion of the wellbore before energizing the nano-particles.

3. The method of claim 2, wherein energizing includes increasing the temperature within the filter cake along the radial face to a temperature that is at least 50° C. greater than the initial circulation temperature of the filter cake.

4. The method of claim 3, wherein energizing comprises heating the nano-particles through the application of thermal energy.

5. The method of claim 4, wherein heating comprises heating using one or more electrically resistive coils, or a steam generator.

6. The method of claim 2, wherein:
the drilling mud is a non-aqueous fluid that comprises an aqueous phase that is between about 10% and 50% by volume; and
the method further comprises mixing the nano-particles into the aqueous phase.

7. The method of claim 6, wherein energizing energizes the nano-particles through the application of electromagnetic frequency waves.

8. The method of claim 7, wherein:
the energy generator is a radio-frequency radiation emitting device or a microwave emitting device; and energizing causes the nano-particles within the aqueous phase to become heated at least momentarily to a temperature that is at least 100° C. greater than an initial circulation temperature of the filter cake, thereby creating nano-explosions within the filter cake along the open-hole portion of the wellbore.

9. The method of claim 7, wherein energizing comprises:
running an energy generator into the wellbore; and
activating the energy generator along the open-hole portion of the wellbore.

10. The method of claim 7, wherein:
the open-hole portion of the wellbore is substantially vertical; and
running the energy generator into the wellbore comprises running the energy generator using a wireline, an electric line, or coiled tubing.

11. The method of claim 7, wherein:
the open-hole portion of the wellbore is oriented at least 30 degrees from vertical; and
running the energy generator into the wellbore comprises running the energy generator using coiled tubing, a tractor, or combinations thereof.

12. The method of claim 7, wherein:
the drilling mud is a non-aqueous drilling mud that comprises diesel oil, mineral oil, a synthetic oil, or combinations thereof.

13. The method of claim 6, wherein the drilling mud further comprises a weighting agent and a viscosification agent.

14. The method of claim 6, further comprising:
running a porous production string into the wellbore after the drill string is withdrawn.

15. The method of claim 14, further comprising:
securing zonal isolation devices to an outer diameter of the porous production string, the zonal isolation devices straddling a selected hydrocarbon-producing zone.

16. The method of claim 2, wherein the nano-particles comprise metallic nano-particles or carbon nanotubes.

17. The method of claim 16, wherein:
energizing comprises emitting microwaves for a time between 5 seconds and 10 minutes.

18. The method of claim 2, wherein:
circulating the drilling mud with the nano-particles is conducted during the formation of the wellbore through one or more hydrocarbon-bearing subsurface intervals; and
the method employs a non-aqueous drilling mud without nano-particles during the formation of the wellbore for at least some strata above the one or more hydrocarbon-bearing subsurface intervals.

19. The method of claim 1, wherein the drilling mud is non-ionic.

20. The method of claim 19, wherein the drilling mud is non-aqueous.

21. The method of claim 1, wherein:
energizing energizes the nano-particles through the application of electromagnetic frequency waves; and
the method further comprises placing a non-ionic fluid within the wellbore across the open-hole portion of the wellbore before energizing the nano-particles to facilitate the transmission of the electromagnetic frequency waves.

22. The method of claim 21, wherein placing a non-ionic fluid within the wellbore across the open-hole portion comprises producing crude oil from a hydrocarbon producing zone for a time.

23. The method of claim 21, wherein placing a non-ionic fluid within the wellbore across the open-hole portion comprises injecting the non-ionic fluid into the open-hole portion using a working string.

24. The method of claim 11, wherein the non-ionic fluid comprises formation oil, synthetic oil, oil-based mud, synthetic-based mud, or combinations thereof.

25. The method of claim 1, wherein the fluid in contact with the nano-particles comprises water.

26. A method for stimulating a well, comprising:
injecting a stimulation fluid into at least a near wellbore region of a wellbore, the wellbore being completed within a hydrocarbon-bearing subsurface formation, and the stimulation fluid comprising chemically inert nano-particles;
running an energy generator into the wellbore that produces at least one of radio-frequency energy, electromagnetic energy, and microwave energy into the nano-particles to heat the nano-particles; and
activating the energy generator to heat the nano-particles to a temperature that causes the nano-particles to at least one of explosively self-destruct or create an explosive phase transition of the stimulation fluid in contact with the nano-particles, to create a micro-fracture in a portion of the subsurface formation.

27. The method of claim 26, wherein:
the energy generator is an electromagnetic wave energy generator; and
activating the wave energy generator causes the stimulation fluid within the near-wellbore region across the selected hydrocarbon-bearing interval to be heated to a temperature that is at least 50° C. greater than a temperature of the near-wellbore region before the thermal energy generator was activated.

28. The method of claim 27, wherein the stimulation fluid is a substantially non-ionic fluid.

29. The method of claim 27, wherein the stimulation fluid further comprises hydrochloric acid, acetic acid, hydrofluoric acid, formic acid, or combinations thereof.

30. The method of claim 29, wherein:
the stimulation fluid further comprises an aqueous phase that is between about 10% and 50% by volume; and
the nano-particles are mixed into the aqueous phase.

31. The method of claim 29, wherein:
the electromagnetic wave energy generator is a radio-frequency radiation emitting device or a microwave emitting device;
activating the energy generator causes the stimulation fluid within the near-wellbore region across the selected hydrocarbon-bearing interval to be heated to a temperature that is at least 200° C. greater than a temperature of the near-wellbore region before the thermal energy generator was activated, thereby creating nano-explosions within the rock matrix within the near-wellbore region.

32. The method of claim 26, wherein the stimulation fluid in contact with the nano-particles comprises water.

* * * * *